March 16, 1926.

F. N. CONNET

VARIABLE SPEED DEVICE

Filed May 5, 1924

Inventor
Frederick N. Connet
By Thomas A. Jenkins Jr.
Attorney

March 16, 1926. 1,577,176
F. N. CONNET
VARIABLE SPEED DEVICE
Filed May 5, 1924 4 Sheets-Sheet 4

Patented Mar. 16, 1926.

1,577,176

UNITED STATES PATENT OFFICE.

FREDERICK N. CONNET, OF PROVIDENCE, RHODE ISLAND, ASSIGNOR TO BUILDERS IRON FOUNDRY, OF PROVIDENCE, RHODE ISLAND, A CORPORATION OF RHODE ISLAND.

VARIABLE-SPEED DEVICE.

Application filed May 5, 1924. Serial No. 711,304.

*To all whom it may concern:*

Be it known that I, FREDERICK N. CONNET, a citizen of the United States, residing at Providence, in the county of Providence and State of Rhode Island, have invented certain new and useful Improvements in Variable-Speed Devices, of which the following is a specification.

My invention relates to speed changers for varying the transmitted speed of a motor, and especially the combination of such a device with a feed device for dry chemicals to be controlled by changes in the rate of flow of fluid in a conduit.

An object of my invention is therefore to provide a variable speed device for varying the transmitted speed of a motor, comprising a variable speed countershaft having a variable speed member mounted therein, and means electrically operated by contacts made by the movement of a movable member actuated by other mechanism to vary the speed of said variable speed member.

A further object of my invention is to provide means for making the speed of driven feed devices proportionate to the rate of flow of fluid in a conduit. My invention is especially adapted for use with dry chemical feed devices controlled by the rate of flow of fluids in a pipe for use more particularly in water works and filtration plants to feed said dry chemicals into said pipe in amounts proportionate to the rate of flow of said fluid in said pipe. A variable orifice feed device for dry chemicals operated by gravity alone is impractical, because of the lumps that are apt to be present. To feed said dry chemicals evenly it is necessary to provide mechanically driven feed devices. My invention therefore provides means for varying the rate of speed of said driven means proportionate to the rate of flow of fluids in the conduit.

These and such other objects of my invention as may hereinafter appear will be best understood from a description of one embodiment thereof, such as is illustrated in the accompanying drawings.

In the drawings, wherein like characters of reference indicate like parts throughout, 10 indicates a pipe through which a fluid is flowing (in the direction of the arrow). 11 generally indicates a chemical feed device to feed dry chemicals into said pipe 10. The pipe 10 is provided with means for obtaining a pressure differential due to the velocity of said fluid, in the embodiment shown a Venturi meter tube, generally indicated as 12, which comprises the usual inlet portion 14 having the usual annular perforated inlet chamber 15 attached thereto, the throat portion 16 having the usual annular perforated chamber 17 attached thereto, and the usual outlet portion 18. Said Venturi tube 12 thus provides means for indicating the difference of pressure between the inlet chamber 15 and throat chamber 16 thereof, which may be transmitted to the indicator 20 to indicate the rate of flow of fluid in said conduit 10. Said tube 12 and indicator 20 thus comprise means attached to a conduit to indicate the rate of flow of the fluid therein, though it is obvious that other well known means may be employed for this purpose.

Figure 1:
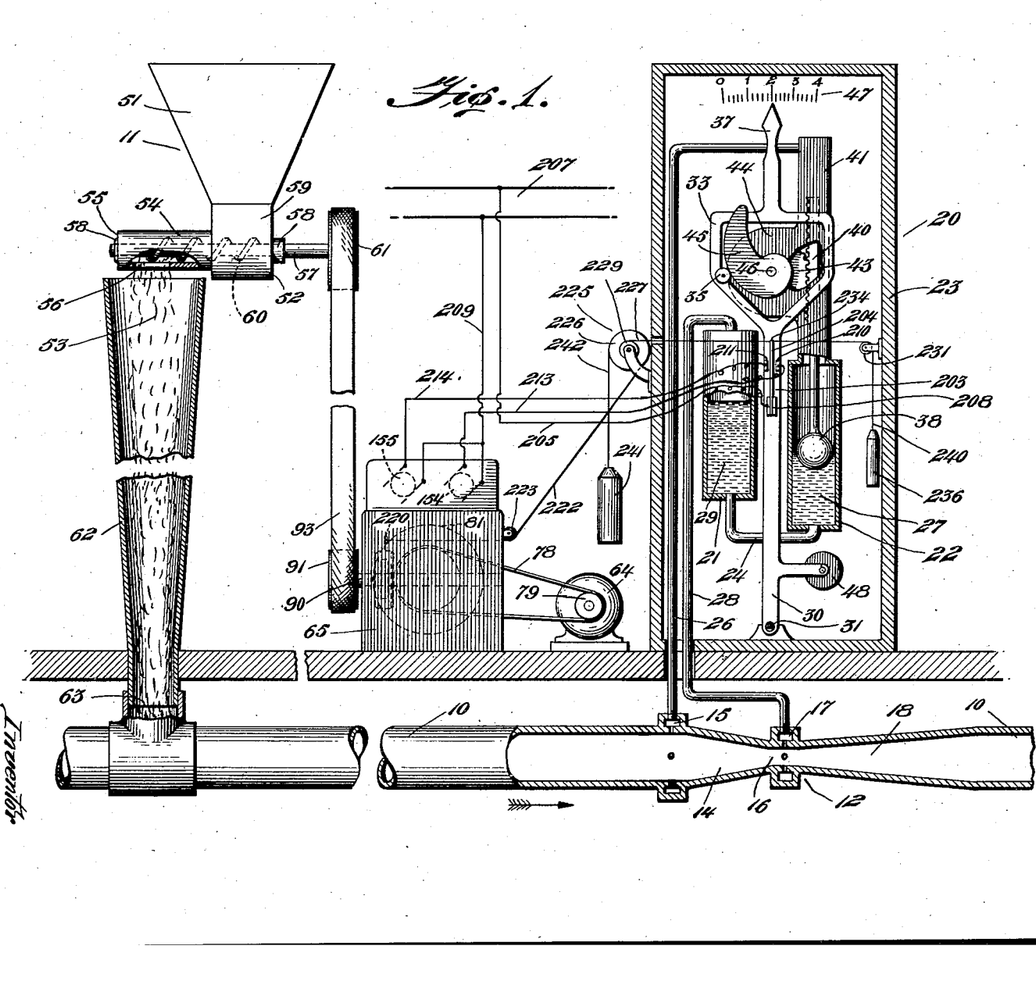
Fig. 1 is a diagrammatic view partially shown in section, showing my invention comprising a conduit containing a Venturi meter tube and indicator actuated thereby, containing a movable member positioned by the pressure difference existing within the Venturi meter tube, a dry chemical feed device, a motor for actuating the same, and a variable speed countershaft having a variable speed member and means controlled by the indicator member positioned by the pressure differential caused by the flow of the fluid in the conduit for altering the speed of said variable speed member.

As shown in Fig. 1, I provide the usual Venturi meter tube pressure difference indicator, generally indicated as 20 to indicate the pressure difference existing in the Venturi meter tube 12, and hence the rate of flow of said fluid. Suitably mounted within a frame 23 of said indicator 20 are two cylindrical chambers 21 and 22, said chambers being connected by a pipe 24. A pipe 26 transmits the inlet pressure from the chamber 15 to a column of fluid, preferably mercury 27 contained in the chamber 22, and a pipe 28 transmits the throat pressure thereof from the chamber 17 to a column of fluid preferably mercury 29 contained in chamber 21 thereof. It is obvious that the mercury is free to flow from the chamber 21 to the chamber 22 and vice versa. A lever 30 preferably pivoted on the knife edge 31 is pivoted within said frame 23. The upper end of said lever 30 comprises a yoke 33 having a roller 35 extending forwardly therefrom.

The pressure difference created by said Venturi tube 12 is thus indicated by the difference in level of the fluid columns 27 and 29. It is obvious that as the pressure of the throat 17 becomes less due to increase of the rate of flow, the mercury 29 in the chamber 21 will rise and the mercury 27 of chamber 22 will fall. A float 38 is suitably floated on the column 27. The height of said float 38 thus indicating the pressure difference between said inlet and throat, being lowered with increase in pressure difference and rate of flow. A rack bar 40 extending upwardly from said float 38 is slidably mounted within a chamber 41 extending upwardly from said chamber 22. The height of said rack bar 40 is thus indicative of the pressure difference between said inlet 14 and throat 16, lowering with the increase thereof. A shaft 46 is revolvably mounted on a portion 44 of the chamber 22 extending laterally from said upward extension 41. A gear 43 adapted to mesh with said rack bar 40 is mounted on said shaft 46 within said lateral extension 44. Said shaft 46 extends forwardly outside of said cylinder portion 44 and has mounted thereon the cam 45. The lever 30 has a counterweight 48 attached to the right hand side thereof which tends to swing it in that direction, and to keep the roller 35 thereof always in contact with the cam 45. Any change in pressure difference between the inlet 14 and throat 16 causes rotary movement of said cam 45 as explained, which is transmitted to the lever 30 and indicated by the pointer 37 thereof on the scale 47 mounted on the stationary frame 23. In the embodiment shown, increase in pressure difference due to increase in rate of flow, operates to permit the counterweight 48 on withdrawal of the cam surface 45 to throw the lever 30 to the right, and on decrease of pressure difference due to decrease in rate of flow the lever 30 is forced to the left by the advancement of the cam surface 45.

Any suitable type of driven feed device 11 may be employed. I have illustrated a simple device which is especially adapted for feeding dry chemicals in filter plants. I provide a large hopper 51 of general conical shape having the base 52 thereof closed. I provide a pipe 54 projecting laterally from one side of the base 52 thereof having a closed end 55. Said pipe 54 is provided with the orifice 56 on the lower periphery thereof near the end 55. A shaft 57 mounted in journals 58 on the opposite side 59 of said hopper 51 and end 55 of said pipe 54, extends longitudinally within said pipe 54 and across the base 52 of said hopper 51. Said shaft 57 has mounted thereon the helical worm screw 60 of the approximate diameter of said pipe, and the pulley 61 outside of said hopper 51. Below the orifice 56 I provide a chute 62 to conduct the amount of chemical discharged to an opening 63 in said pipe. The operation of said feed device is obvious from the above description. The chemical 53 is inserted in the hopper 51, the revolving worm screw 60 carries a predetermined amount along the pipe 54 and drops it by gravity through the orifice 56 into the chute 62. The rate of feed thereof depends therefore on the rate of revolution of said shaft 57.

Any suitable motive means such as the constant speed electric motor 64 may be provided to drive said feed device.

Figure 2:
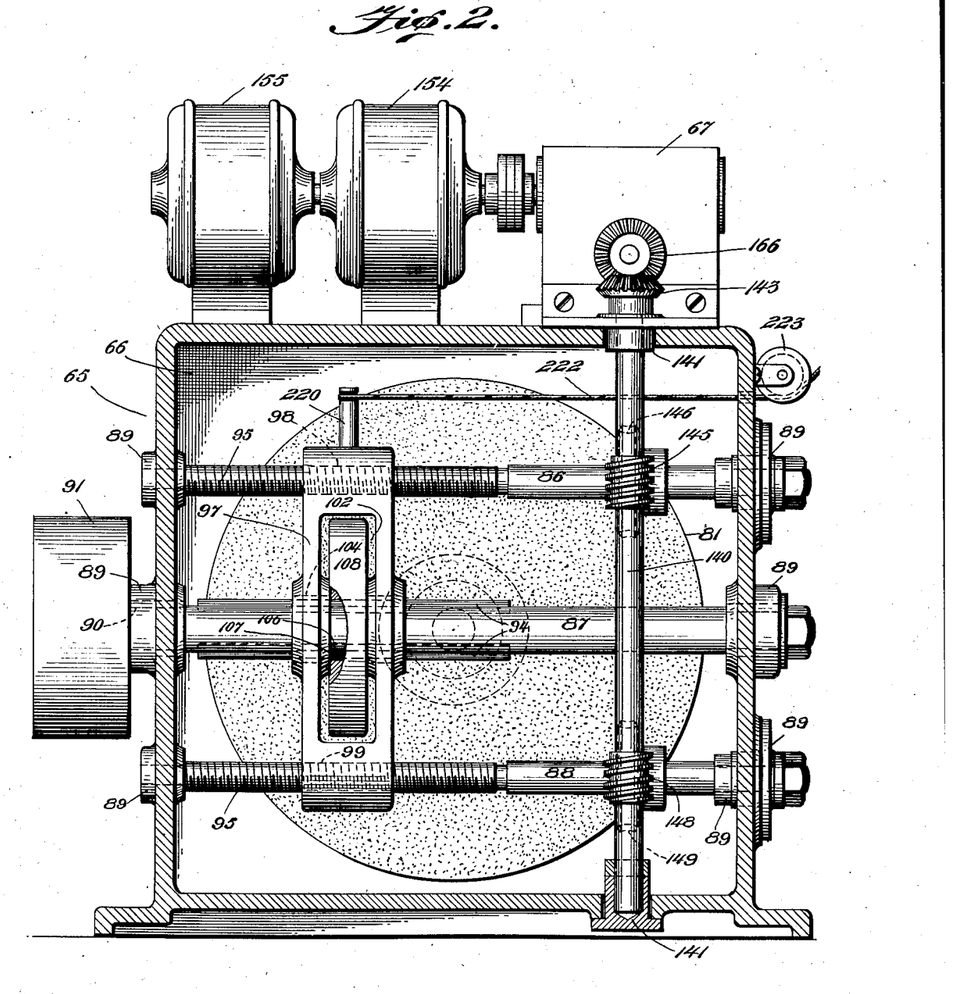
Fig. 2 is a front view partially shown in section of the variable speed device.
Figure 3:
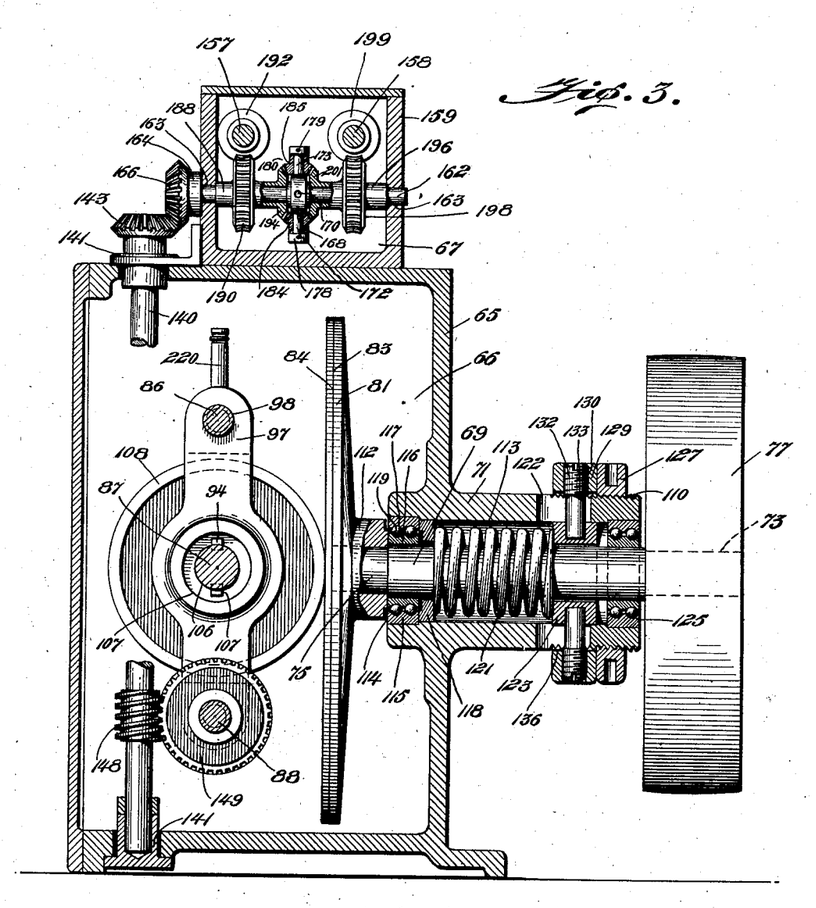
Fig. 3 is a vertical transverse sectional view of the variable speed device.
Figure 4:
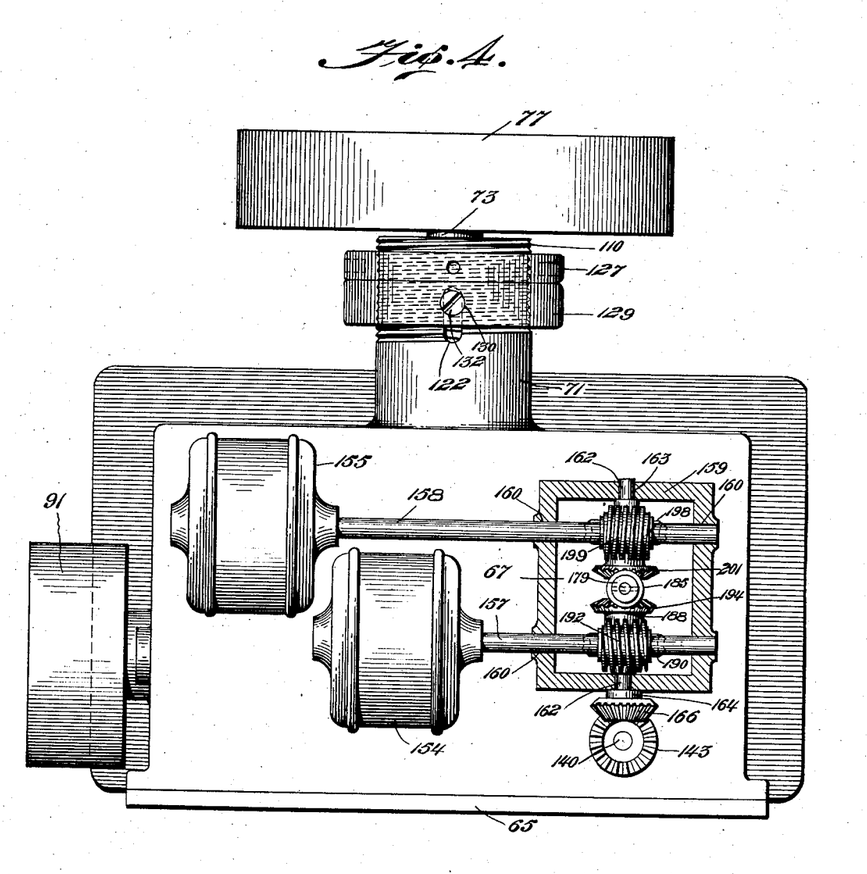
Fig. 4 is a plan view of said variable feed device showing the differential gearing in partial section.

As stated, my invention also comprises an improved variable speed device actuated by movable means from without, for varying the transmission of the speed of any motor, said speed changing device being conveniently inserted at any point in the transmission system. Details of my improved embodiment are shown in Figs. 2, 3 and 4. The metal box 65 is provided with a lower compartment 66 and an upper compartment 67. I employ the terms "longitudinal and transverse" relative to the set up position of the various elements thereof in the box 65, and not relative to their individual construction. The device enclosed in the lower compartment 66 of the box 65 comprises an improved so-called "variable speed countershaft" 68 which is interposed in the transmission system between the motor 64 and the feed device 11, to vary the transmitted speed thereof. A shaft 69 is mounted within an extension 71 from the rear of said lower compartment 66. The rear end 73 of said shaft 69 projects from the rear end of said extension 71, and the front end 75 thereof extends transversely a portion of the distance across the compartment 66. A pulley 77 is mounted on the rear end 73 of shaft 69, said pulley 77 being driven by a belt 78 which is driven by the pulley 79 on the motor 64. The large circular disk 81 extends from the front end 75 of said shaft 69 in a vertical longitudinal plane. The face 83 of said disk 81 is preferably surfaced with leather 84 for a purpose to be described.

Three shafts 86, 87 and 88, revolvably mounted in journals 89 in the ends of said compartment 66, extend longitudinally thereof approximately centrally thereof and approximately equidistant one above the other. The central shaft 87 has one end 90 projecting outside of said box 65, said end 90 having mounted thereon the pulley 91, from which the belt 93 leads to the pulley 61 of the feed device 11 to impart motion thereto. Said central shaft 87 is splined as at 94 from a point approximately at the center thereof to the edge of the box 65 near the projecting end 90 thereof. The upper and lower shafts 86 and 88 are threaded as at 95 from the same corresponding points. A longitudinally movable bearing yoke 97 extends from the upper and lower shafts 86 and 88 and is provided at its upper and lower ends with threaded holes 98 and 99 for threaded mounting on said upper and lower shafts 86 and 88. Said yoke 97 is provided with a central, hollowed-out portion 102 and a longitudinal central bore 104. A wheel 108 revolves in the central hollowed out portion 102 of said yoke 97. The center bore 106 of said wheel 108 is grooved as at 107 to slide longitudinally on and to drive the splined central shaft 87. Said wheel 108 thus drives the splined central shaft 87, pulley 91 and feed device 11. The wheel 108 is driven by frictional contact with the face 83 of the disk 81. It is obvious that the wheel 108 is free to move radially with the slidable yoke 97 from the approximate center of said disk 81 to its periphery, and that its revolvable speed is proportionate to its relative contacting position thereon, the speed thereof in the embodiment shown, being greater the further it is moved to the left or radially outwards on said disk 81.

I provide the novel means shown in Fig. 3 for adjustably varying the frictional contact of the leather faced disk 81 with the wheel 108. As stated, the extension 71 for the disk shaft 69 projects from the rear of the box 65. The rear portion of said extension 71 is externally threaded as at 110 for a purpose to be described. The disk 81 is provided with a rearwardly extending hub 112. In the front end of the bore 113, of the extension 71 contacting said hub 112 I provide the ball bearing 114. This comprises the two rings 115 and 116 of different diameters adapted to enclose each other and provided with the recesses 117 to receive the balls 119 between the adjacent surfaces thereof. Adjacent said ball bearing 114 and contacting the rear side of the outer ring 115 thereof is the washer 118. A helical coil spring 121 surrounds said shaft 73 and projects from said washer 118 to a collar 123 in the rear thereof. A ball bearing 125 identical in construction to 114 is placed at the rear end of said bore 113. The extension 71 is transversely slotted on both sides as at 122 for a short distance annularly above the position occupied by the collar 123. An internally threaded ring 127 surrounds the threaded portion 110 of said extension 71 and contacts with the rear face of a ring 129 loosely mounted on said extension 71. The ring 129 is provided with the threaded radial holes 130 to receive the screws 132 provided with the threaded heads 133 therein. The inner ends of said screws project into annular groove 136 in the collar 123. It is obvious that rotation of the threaded ring 127 through the medium of the front ring 129, screws 132 and the collar 123 will alter the compressive force of the spring 121 against the washer 119 and ball bearing 114 and thus the force exerted by the face 83 of the disk 81 against the revolving wheel 108.

A shaft 140 mounted in suitable journals 141 extends from the bottom of the compartment 66 through the top thereof, in front of the longitudinally extending shafts 86, 87, and 88. Said shaft 140 is provided at its upper end with a bevel gear 143. I mount on said shaft 140 adjacent the top shaft 86, the worm 145 adapted to engage the worm gear 146 on said shaft 86, and adjacent the bottom shaft 88 the worm 148 adapted to engage the worm gear 149 on said shaft 88. From the above description it is obvious that turning said shaft 140 in one direction will operate through the medium of the threaded engagement of the slidable yoke 97 on the top and bottom shafts 86 and 88 to draw the wheel 108 toward the center of the disk 81 which revolves at constant speed, thus reducing the speed of said wheel 108, and that turning the shaft 140 in the opposite direction will operate to draw the wheel 108 towards the periphery of said revolving disk 81, thus increasing the speed of said wheel 108. The variations in speed of the wheel 108 are transmitted as explained to the feed device 11.

I will now describe the means for varying the speed of the variable speed member 108 of the variable speed countershaft 68. To thus vary the position of said wheel 108 on the surface of the disk 81, I provide two motors 154 and 155, which with the differential gearing about to be described may be conveniently located on top of and in the upper compartment 67 of the box 65 respectively. The front motor 154 operates through the medium of the differential gearing about to be described, to drive said shaft 140 in a direction to move the wheel 108 towards the center of the disk 81, thus decreasing the speed of said wheel. The rear motor 155 operates to drive said shaft 140 in the opposite direction through the medium of the same differential gearing to move said wheel 108 radially outwards on the disk 81, thus increasing the speed of said wheel. Shafts 157 and 158 project longitudinally from said motors 154 and 155, respectively into the gear box 159, being mounted in suitable journals 160 therein.

A shaft 162 mounted in suitable journals 163 extends transversely through said gear box 159, and has its front end 164 projecting through the front of the gear box 159, said front end 164 having a bevel gear 166 mounted thereon to engage the bevel gear 143 on the upper end 141 of the shaft 140. Said shaft 162 has at approximately the center of the gear box 159 the collar 168 firmly attached thereto by means of the pin 170. Small shafts 172 and 173 are mounted in radial holes cut in said collar at diametrically opposite points on the periphery thereof, which small shafts 172 and 173 have the collars 178 and 179 securely attached to their outer ends. On said shafts 172 and 173 between the collar 168 and the individual collars 178 and 179 are loosely mounted the bevel gears 184 and 185. Said collar 168 and small shafts 172 and 173 thus form a cross shaft 180 securely attached to said shaft 162 at right angles thereto. Between said collar 168 and the front end of said gear box 159, a sleeve 188 is loosely mounted on said transverse shaft 162. Said sleeve 188 is provided with a worm gear 190 adapted to enmesh a right-hand worm 192 on the motor shaft 157. The rear end of said sleeve 188 is provided with a bevel gear 194 adapted to enmesh the bevel gears 184 and 185 on the cross shaft 180. Between said collar 168 and the rear edge of said gear box 159, a sleeve 196 is loosely mounted on said transverse shaft 162. Said sleeve 196 is provided with a worm gear 198 adapted to enmesh a left-hand worm 199 on the rear motor shaft 158. The front end of said sleeve 196 is provided with a bevel gear 201 adapted to enmesh the bevel gears 184 and 185 on the cross shaft 180. The operation of said motors and differential gearing is obvious from the above description. When it is desired to move the wheel 108 outwards across the face of the disk 81, the rear motor 155 is started up and motion is transmitted thereby through said left-hand worm 199, worm gear 198, sleeve 196, bevel gear 201, bevel gears 184, and 185 to the cross shaft 180 and shaft 162 attached thereto (the bevel gear 194 remaining stationary and the bevel gears 184 and 185 revolving around it to impart rotary motion to the cross shaft 180), bevel gear 166 to operate to move the shaft 140 in a direction to move the yoke 97 and wheel 108 radially outwards on said disk 81, thus increasing the speed of said wheel 108 until the rear motor 155 is stopped. When the front motor 154 is started up, the same differential gearing similarly operates through the medium of the right-hand worm 192 to revolve the shaft 104 in a reverse direction to move the yoke 97 and wheel 108 radially towards the center of the disk 81, thus decreasing the speed of said wheel 108, the differential gearing however, then revolving in the opposite direction around the then stationary bevel gear 201, to impart the opposite motion to the shaft 162 until said front motor 154 is stopped.

I will now describe the electric contact forming means actuated by movements of the movable member of the pressure differential indicator positioned by the difference in pressure as indicated by the Venturi meter to start the aforedescribed means to vary the speed of the variable speed member of the variable speed countershaft. Thus in the embodiment shown to actuate the rear motor 155 to move the wheel 108 outwards on the face of the disk 81 to increase the speed thereof, and to actuate the front motor 154 to move the wheel 108 towards the center of the disk 81 to decrease the speed thereof, I provide the novel electrical means described actuated by the pivoted lever 30 on the Venturi meter indicator 20. I mount a two-way flexible blade switch 203 having a flexible upwardly extending blade 204 on said lever 30 and insulated therefrom and I attach the wire 205, suitably connected to any suitable source of electricity such as the line 207 to the base thereof. Suitable contact forming lugs 210 and 211 are mounted on each side of the lever 30 and insulated therefrom adjacent the flexible blade 204. The lug 210 placed on the right-hand side of said lever 30 in the embodiment shown, is suitably connected by means of the wire 213 to the front motor 154. The lug 211, suitably mounted on the left hand side of said lever 30 in the embodiment shown is suitably connected by means of the wire 214 to the rear motor 155. It is thus obvious in the embodiment shown that when the rate of flow of fluid and hence the pressure differential increases that the lever 30 will be swung to the right, and that the blade 204 will contact the lug 211 on the left hand side of said lever. This will complete the circuit to start the rear motor 155 which will operate to move the wheel 108 outwards on the disk 81, thus increasing the rate of speed of the chemical feed device 11. It is also obvious that when the rate of flow and hence the pressure differential decreases in the embodiment shown, that the lever 30 will swing to the left. The flexible blade 204 will then contact the lug 210 on the right-hand side of said lever. This will complete the circuit to start the front motor 154 which will operate to move the wheel 108 radially inwards on the disk 81, thus decreasing the rate of speed thereof and hence decreasing the rate of speed of the feed device 11.

I will now describe the means controlled by the variable speed member of the variable speed countershaft effective on the desired variation of the speed thereof to stop the functioning of said means to vary the speed of said variable speed member. Thus in the embodiment shown, to shut off the motors 154 or 155 when the wheel 108 has been moved the desired amount to vary the rate of feeding to correspond to the change in the rate of flow, I provide the novel means to be described. I mount the upwardly projecting post 220 on the upper end of the yoke 97, and attach thereto a flexible cord 222; said cord 222 is guided by the guide wheel 223 to the direction reversing spool 225 where it is coiled on the larger wheel 226 thereof. Another flexible cord 227 is suitably coiled around the smaller wheel 229 of said spool 225, and passes through the side of the register box 20, is securely looped around the upper end 234 of the flexible switch blade 204 and over a guide wheel 231 on the opposite side of the box 20. A suitable weight 236 is attached to the end 240 thereof, said weight thus depending in the box 20. It is obvious that the weight 236 operates to keep the cord 227 horizontally taut to keep the flexible blade 204 at all times in a temporarily fixed position to permit contact thereof with the lugs 210 or 211 as the lever 30 swings to insure the proper functioning of the operation described at the end of the last paragraph. Said combined means just described serves in addition to automatically shut off the motors 154 or 155 when the rate of speed has been varied the desired amount by the desired movement of the wheel 108 across the face of the disk 81. On increase of rate of flow and hence of pressure differential, as explained the flexible blade 204 will be brought into contact with the lug 211 on the left hand side of lever 30. This contact will then operate to complete a circuit to operate the rear motor 155 to move the wheel 108 radially outward across the face of the disk 81, thus increasing the rate of speed of the feed device 11. The radial outward movement of said wheel 108 and yoke 97 will draw the cord 222 with it. As the cord 222 is pulled outwards, the cord 227 is released due to the reversal of motion in the reversing spool 225, and when the yoke 97 and the wheel 108 have been moved the desired amount, thus increasing the rate of speed according to the increase of the rate of flow, as explained, the weight 236 will operate through the medium of the thus released cord 227 to pull the blade 204 out of contact with the lug 211, thus stopping the rear motor 155, the consequent radial outward movement of the wheel 108 on the disk 81, and the consequent increase in feed speed of the feed device 11. It is also obvious that as the rate of flow and hence the pressure differential decreases, as explained, the flexible blade 204 will be brought into contact with the lug 211 on the right-hand side of the lever 30. This contact will then operate to complete a circuit to start the front motor 154, to move the wheel 108 radially toward the center of the disk 81, thus decreasing the speed of the feed device 11. The radial inward movement of said wheel 108 and yoke 97 will slacken the cord 222. As the cord 222 is released the cord 227 is drawn up against the action of the weight 236 by the heavier counterweight 241 attached by means of the cord 242 to wheel 226. Thus when the yoke 97 and wheel 108 have been moved the desired amount to decrease the rate of speed of the feed device 11 according to the variation in the rate of flow of the fluid in the conduit, the cord 227 will operate to pull the blade 204 out of contact with the lug 211, thus stopping the front motor 154, consequent inward radial movement of the wheel 108 on the disk 81 and consequent decrease of feed speed of the feed device 11.

The operation of my invention is as follows:

Referring to Fig. 1, first assume that there is no flow of fluid through the conduit 10 and Venturi meter tube 12. There will be no differential pressure between the two chambers 15 and 17 of the Venturi tube and therefore the mercury levels in the two mercury wells 21 and 22 of the Venturi indicator 20 will be at the same elevation: the float 38 and rack 40 within the upstream mercury well 22 will be at the topmost position; the rack gear 43 and cam 45 will be at their most anti-clockwise angle; the lever 30 will be at the extreme left; the flexible switch blade 204 will be midway between the two contact points 210 and 211; the wheel 108 will be substantially at the center of the revolving disk 81 and hence it will not rotate appreciably; therefore substantially no motion will be transmitted to the chemical feeder 11. Next assume that there is a flow of fluid through the Venturi tube 12 thus creating a small differential between the two chambers 21 and 22 of the indicator 20. This will cause a small transfer of mercury from the right hand mercury well 22 to the left hand mercury well 21; the float 38 and its rack 40 will descend and rotate the gear 43 and cam 45 clockwise thus allowing the lever 30 to move toward the right. Since the flexible switch blade 204 is held by the cord 227 it will remain stationary but the left hand contact point being attached to the lever 30, will advance and as soon as it touches the flexible blade 204 it will complete an electric circuit and will start the front motor 154 which will push the wheel 108 radially from the center toward the circumference of the rotating disk 81. Meanwhile the yoke 97 will pull the cord 222 which in turn will allow the other cord 227 to move toward the right.

The latter cord will pull the flexible switch blade 204 away from the left hand contact point 211 thus stopping the front motor 154 and the revolving disk 81 will transmit a continuous rotation to the wheel 108 and consequently to the chemical feeder 11. The cam 45 of the Venturi indicator is so shaped that the movement of the lever 30 is directly proportional to the flow of the fluid and hence the horizontal travel of the wheel 108 is also directly proportional to the flow of the fluid. Since the speed of rotation of this wheel 108 is substantially directly proportional to its distance from the center of the revolving disk 81 the discharge of chemical from the chemical feeder 11 is likewise directly proportional to the flow of the fluid through the Venturi tube 12. The object desired is therefore accomplished. Similarly any reduction in the flow through the Venturi tube 12 is accompanied by a rise of the float 38 on the mercury 27; a left hand travel of the lever 30; a contacting of the right hand contact point 210 and the flexible switch blade 204; a starting of the rear motor 155 and consequent travel of the wheel 108 toward the center of the revolving disk 81. The motor 155 stops at the proper time when the discharge of chemical is reduced to be proportional to the rate of flow of fluid.

To summarize the operation of my device, increase of rate of flow of fluid in the conduit causes increase of pressure differential existing in the Venturi meter tube, said increase in pressure differential positions the lever 30 as explained to correspond thereto, said positioning of said lever 30 completes an electrical circuit which starts a motor which operates to increase the speed of a variable speed member of a variable speed countershaft, which increases the transmitted speed of a constant speed motor to a chemical feed device until it is in proportion to the increase of the rate of flow of the fluid in said conduit, the variable speed member of said variable speed countershaft then automatically operating to break the electrical contact, and to stop the operation of the motor, thus stopping the increase in speed of the variable speed member. On decrease of the rate of flow of said fluid in said conduit, my invention functions in similar manner to proportionately decrease the rate of feed thereof and to automatically stop the decrement thereof.

It is obvious that I have provided an improved variable speed device for varying the transmitted speed of motors. I have also provided the novel combination of a driven feed device and means to change the speed of said feed device to correspond with changes in the rate of flow of fluid in a conduit.

I employ the word "indicator" to signify an instrument which will either indicate or record the rate of flow or register the quantity of flow, or all severally or entirely combined.

It is understood that my invention is not limited to the specific embodiment shown, and that various deviations may be made therefrom without departing from the spirit and scope of the appended claims.

What I claim as new and desire to secure as Letters Patent is:

1. An apparatus for feeding a material proportionately to the rate of flow of fluid in a conduit comprising in combination a constant-speed motor, a feeding device having a driving shaft, the rate of feeding thereof being proportionate to the driven speed of said shaft, and means to vary the speed transmitted to said shaft proportionately to the rate of flow of fluid in said conduit.

2. An apparatus for feeding a material proportionately to the rate of flow of fluid in a conduit comprising in combination a constant speed motor, a feeding device having a driving shaft, the rate of feeding thereof being proportionate to the driven speed of said shaft, a variable-speed power transmitting means between the constant-speed motor and the feeding device and means controlled by the rate of flow of said fluid in said conduit for governing said variable-speed power transmitting means proportionately to said rate of flow.

3. An apparatus for feeding a material proportionately to the rate of flow of a fluid in a conduit, comprising in combination, a feeding device having a driven shaft for feeding said material in proportion to the revolution of said driving shaft, a constant speed motor to actuate the same, a variable speed countershaft having a variable speed member interposed between said feed device and said motor and means to vary the speed of the variable speed member thereof proportionately to the rate of flow of fluid in said conduit.

4. An apparatus for feeding a material proportionately to the rate of flow of a fluid in a conduit, comprising in combination, a feeding device for feeding said material in proportion to the revolutions of said driving shaft, a constant speed motor to actuate the same, a variable speed countershaft interposed between said feed device and actuating motor having a variable speed member, connected to the driving shaft of said feeding device, means for metering the rate of flow of said fluid in said conduit and means actuated by said meter for varying the speed of said variable speed member and hence said feeding device proportionately to the rate of flow of fluid in said conduit.

5. An apparatus for feeding a material proportionately to the rate of flow of a fluid in a conduit comprising in combination, a feeding device having a driving shaft for feeding said material in proportion to the revolutions of said driving shaft, a constant speed motor to actuate the same, means for metering the rate of flow of said fluid in said conduit, and means actuated by said meter to vary the transmitted speed of said motor proportionately to the rate of flow of fluid in said conduit.

6. An apparatus for feeding a material proportionately to the rate of flow of a fluid in a conduit, comprising in combination, means for obtaining a pressure differential due to and varying in a definite manner with the velocity of said fluid, a member positioned by said differential, a constant speed motor, a feeding device having a driving shaft for feeding said material proportionately to the revolutions of said driving shaft, a variable speed counter shaft interposed between said motor and said feeding device having a variable speed member connected to said feeding device driving shaft and means controlled by the member positioned by said pressure differential to vary the speed of said variable speed member and hence said feeding device proportionately to the rate of flow of fluid in said conduit.

7. An apparatus for feeding a material proportionately to the rate of flow of a fluid in a conduit, comprising in combination, means for obtaining a pressure differential due to and varying in a definite manner with the velocity of said fluid, a member positioned by said differential, a constant speed motor, a device having a driving shaft for feeding said material in proportion to the revolutions of said driving shaft, a variable speed counter shaft interposed between said motor and said feeding device having a variable speed member, connected to said feeding device driving shaft, means controlled by the member positioned by said pressure differential to alter the speed of said variable member and hence feeding device, and means actuated by said variable speed member to stop the alteration of speed thereof when the speed thereof is proportionate to the rate of flow.

8. An apparatus for feeding a material proportionately to the rate of flow of fluid in a conduit, comprising in combination, a Venturi meter tube in series with said conduit, a member in a Venturi meter indicator positioned by the pressure differential created by said meter tube, a constant speed motor, a device having a driving shaft for feeding said material in proportion to the revolutions of said driving shaft, a variable speed countershaft containing a driving disk connected to said motor and a wheel to drive said feeding device in frictional contact with the face of said disk between the centre and periphery thereof and means controlled by the position of the member in the Venturi meter indicator to position said wheel on the face of said disk to alter the speed thereof proportionately to the rate of flow of fluid in said conduit.

9. An apparatus for feeding a material proportionately to the rate of flow of fluid in a conduit, comprising in combination, a Venturi meter tube in series with said conduit, a member in a Venturi meter indicator positioned by the pressure differential created by said meter tube, a constant speed motor, a device having a driving shaft for feeding said material in proportion to the revolutions of said driving shaft, a variable speed countershaft containing a driving disk connected to said motor and a wheel to drive said feeding device in frictional contact with the face of said disk between the centre and periphery thereof, means controlled by the position of the member in the Venturi meter indicator positioned by said pressure differential to alter the radial position of said wheel on the face of said disk to alter the speed thereof and means actuated alter the speed thereof and means actuated by said variable speed member to stop the alteration of speed thereof when the speed thereof is proportionate to the rate of flow.

10. An apparatus for feeding a material proportionately to the rate of flow of fluid in a conduit, comprising in combination, means for obtaining a pressure differential due to and varying in a definite manner with the velocity of said fluid, a member positioned by said differential, a constant speed motor, a device having a driving shaft for feeding said material in proportion to the revolutions of said driving shaft, a variable speed countershaft interposed between said motor and feeding device having a variable speed member, means to change the speed of said variable speed member, means controlled by the position of the member positioned by said pressure differential to start the functioning of said speed changing means, and means actuated by said variable speed member to stop the functioning of said speed changing means when the speed of the variable speed member is proportionate to the rate of flow.

11. An apparatus for feeding a material proportionately to the rate of flow of a fluid in a conduit, comprising in combination, a Venturi meter tube attached to said conduit, a member in a Venturi meter indicator positioned by the pressure differential created by said meter tube, a constant speed motor, a device having a driving shaft for feeding said material in proportion to the revolutions of said driving shaft, a variable speed countershaft containing a driving disk connected to said motor and a wheel to drive said feeding device in frictional contact with the face of said disk between the centre and periphery thereof, electrically operated means to move the wheel radially on the face of said disk to vary the speed thereof, electric contacts operated by said member positioned by said pressure differential to complete an electric circuit to start said speed changing means, and a cord operated by the radial movement of said disk to disconnect said contacts to stop the functioning of said electrically operated speed changing means when the speed of the wheel is proportionate to the rate of flow.

12. An apparatus for feeding a material proportionately to the rate of flow of a fluid in a conduit, comprising in combination, means for obtaining a pressure differential due to and varying in a definite manner with the velocity of said fluid, a member positioned by said differential, a constant speed motor, a device having a driving shaft for feeding said material in proportion to the revolutions of said driving shaft, a variable speed countershaft interposed between said motor and said feeding device having a variable speed member, electrically operated means to vary the position of said variable speed member to vary the speed thereof, and means operated by the movement of said variable speed member to stop the functioning of said means when the speed of the variable speed member is proportionate to the rate of flow.

13. An apparatus for feeding a material proportionately to the rate of flow of a fluid in a conduit, comprising in combination, a Venturi meter tube attached to said conduit, a member in a Venturi indicator positioned by the pressure differential created by said Venturi meter tube, a constant speed motor, a device having a driving shaft for feeding said material in proportion to the revolutions of said driving shaft, a variable speed countershaft containing a driving disk connected to said motor and a wheel to drive said feeding device in frictional contact with the face of the disk between the centre and periphery thereof, electrically operated means to move said wheel radially on the face of said disk to vary the speed thereof, and a cord operated by the radial movement of said disk to stop the functioning of said electrically operated means when the speed of the variable speed member is proportionate to the rate of flow.

14. An apparatus for feeding a material proportionately to the rate of flow of a fluid in a conduit, comprising in combination, means for obtaining a pressure differential due to and varying in a definite manner with the velocity of said fluid, a member positioned by said differential, a constant speed motor, a device having a driving shaft for feeding said material in proportion to the revolutions of said driving shaft, a variable speed countershaft interposed between said motor and said feeding device having a variable speed member and means controlled jointly by the member positioned by said pressure differential and said variable speed member to alter the speed of said variable speed member proportionately to the rate of flow of fluid in said conduit.

15. An apparatus for feeding a material proportionately to the rate of flow of a fluid in a conduit, comprising in combination, a Venturi meter tube attached to said conduit, a member in a Venturi meter indicator positioned by the pressure differential created by said Venturi meter tube, a constant speed motor, a device having a driving shaft for feeding an amount of said material in proportion to the revolutions of said driving shaft, a variable speed countershaft containing a driving disk connected to said motor and a wheel to drive said feeding device in frictional contact with the face of said disk between the centre and periphery thereof, and electrically operated means controlled jointly by the member positioned by the pressure differential and said wheel to move the said wheel radially on said disk to alter the speed thereof proportionately to the rate of flow of fluid in said conduit.

16. An apparatus for feeding a material proportionately to the rate of flow of a fluid in a conduit, comprising in combination, a Venturi meter tube in series with said conduit, a member in a Venturi meter indicator moved in proportion to the valocity of flow of fluid through said meter tube, a two-way electric switch which completes one of two electric circuits when said member moves to a new position due to an increase of flow through the meter tube and complete the other circuit when there is a decrease in the flow, two electric motors actuated respectively by said electric circuits, a variable speed countershaft whose driving element is rotated at constant speed by an independent motor and whose driven element rotates at a variable speed dependent upon the position of the movable member in the indicator, means connecting said driven element and said electric motors whereby the operation of one motor will increase and that of the other will decrease the speed of said driven element, means connecting said driven element of the countershaft and said two-way electric switch to disconnect the circuit when the desired variation in speed of the driven element is accomplished and a feeding device having a driving shaft for feeding material in proportion to the revolutions of said driving shaft connected to the variable speed driven element of said countershaft to deliver a quantity of material to the fluid flowing through said conduit proportionate to the rate of flow of fluid therein.

17. An apparatus for feeding a material proportionately to the rate of flow of a fluid in a conduit, comprising in combination, a Venturi meter tube in series with said conduit, a member in a Venturi meter indicator moved in proportion to the velocity of flow of fluid through said meter tube, a two-way electric switch which completes one of two electric circuits when said member moves to a new position due to an increase of flow through the meter tube and completes the other circuit when there is a decrease in the flow, two electric motors actuated respectively by said electric circuits, a variable speed countershaft whose driving element is rotated at constant speed by an independent motor and whose driven element rotates at a variable speed dependent upon the position of the movable member in the indicator, means including differential gearing connecting said driven element and said electric motors whereby the operation of one motor will increase and that of the other will decrease the speed of said driven element, means connecting said driven element of the countershaft and said two-way electric switch to disconnect the circuit when the desired variation in speed of the driven element is accomplished and a feeding device having a driving shaft for feeding material in proportion to the revolutions of said driving shaft connected to the variable speed driven element of said countershaft to deliver a quantity of material to the fluid flowing through said conduit proportionate to the rate of flow of fluid therein.

In testimony whereof I affix my signature.

FREDERICK N. CONNET.